July 7, 1936.  R. M. HICKS ET AL  2,046,381
BID AND ASKED QUOTATION SYSTEM
Filed Dec. 10, 1930  11 Sheets-Sheet 1
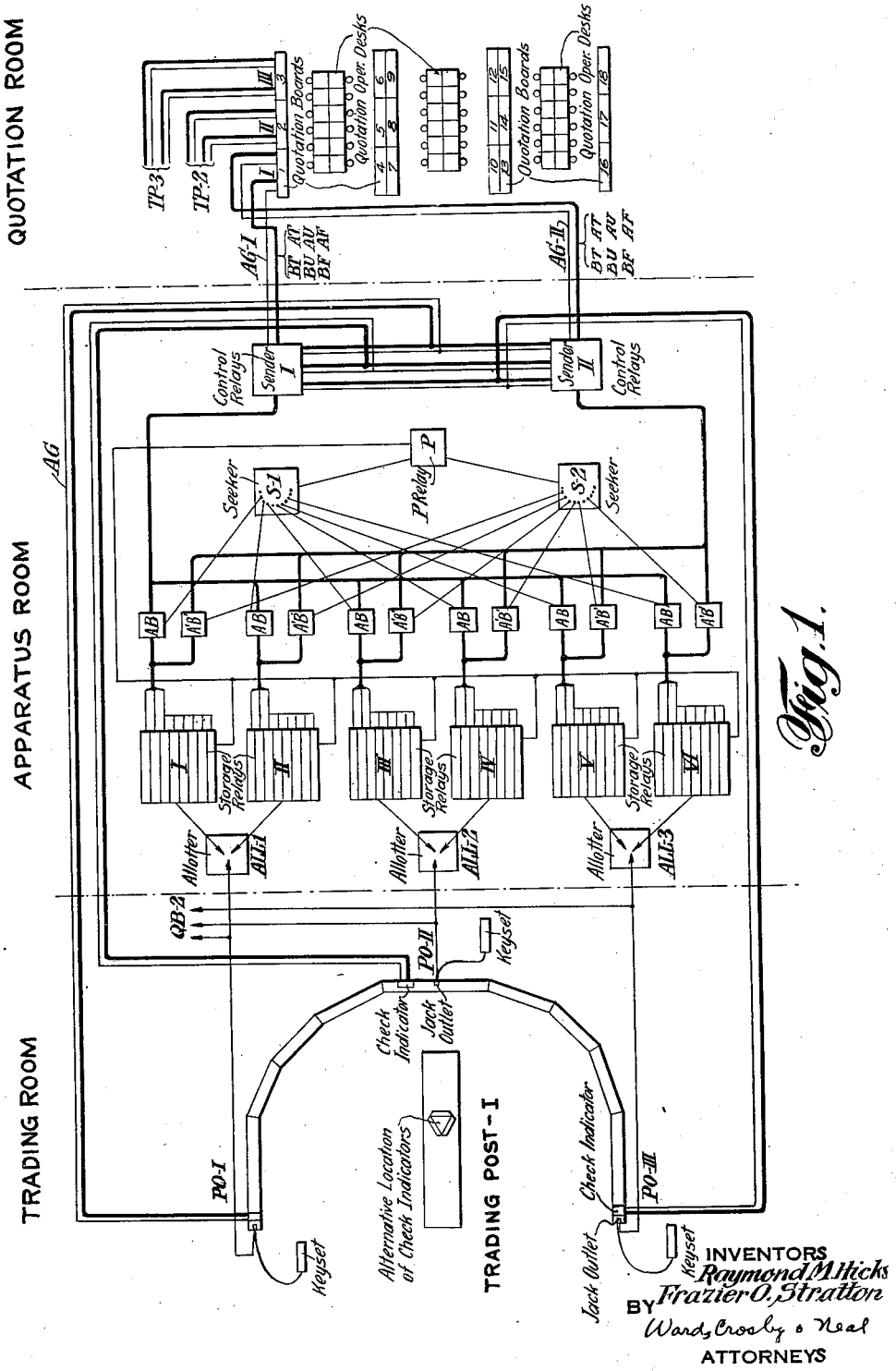

July 7, 1936.   R. M. HICKS ET AL   2,046,381
BID AND ASKED QUOTATION SYSTEM
Filed Dec. 10, 1930   11 Sheets-Sheet 2
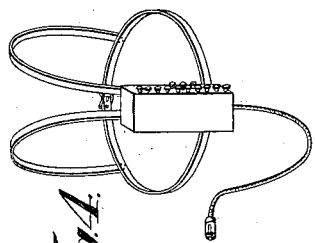
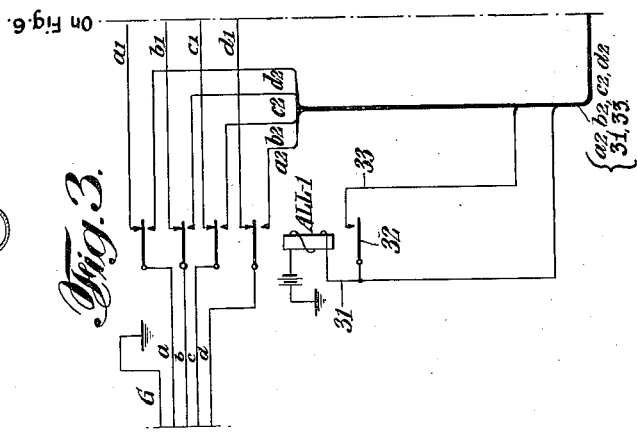
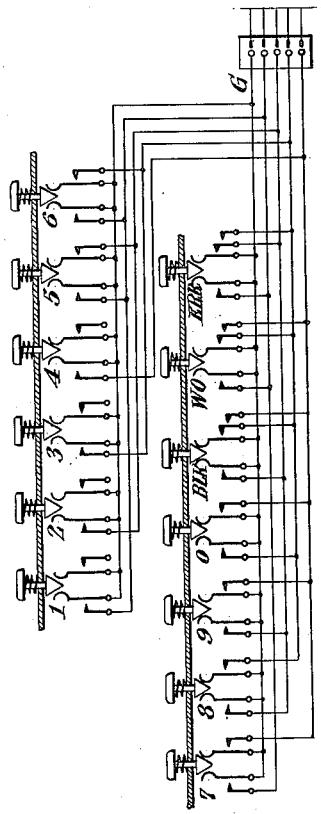
INVENTORS
Raymond M. Hicks
Frazier O. Stratton
BY Ward, Crosby + Neal
ATTORNEYS July 7, 1936.  R. M. HICKS ET AL  2,046,381
BID AND ASKED QUOTATION SYSTEM
Filed Dec. 10, 1930  11 Sheets-Sheet 3
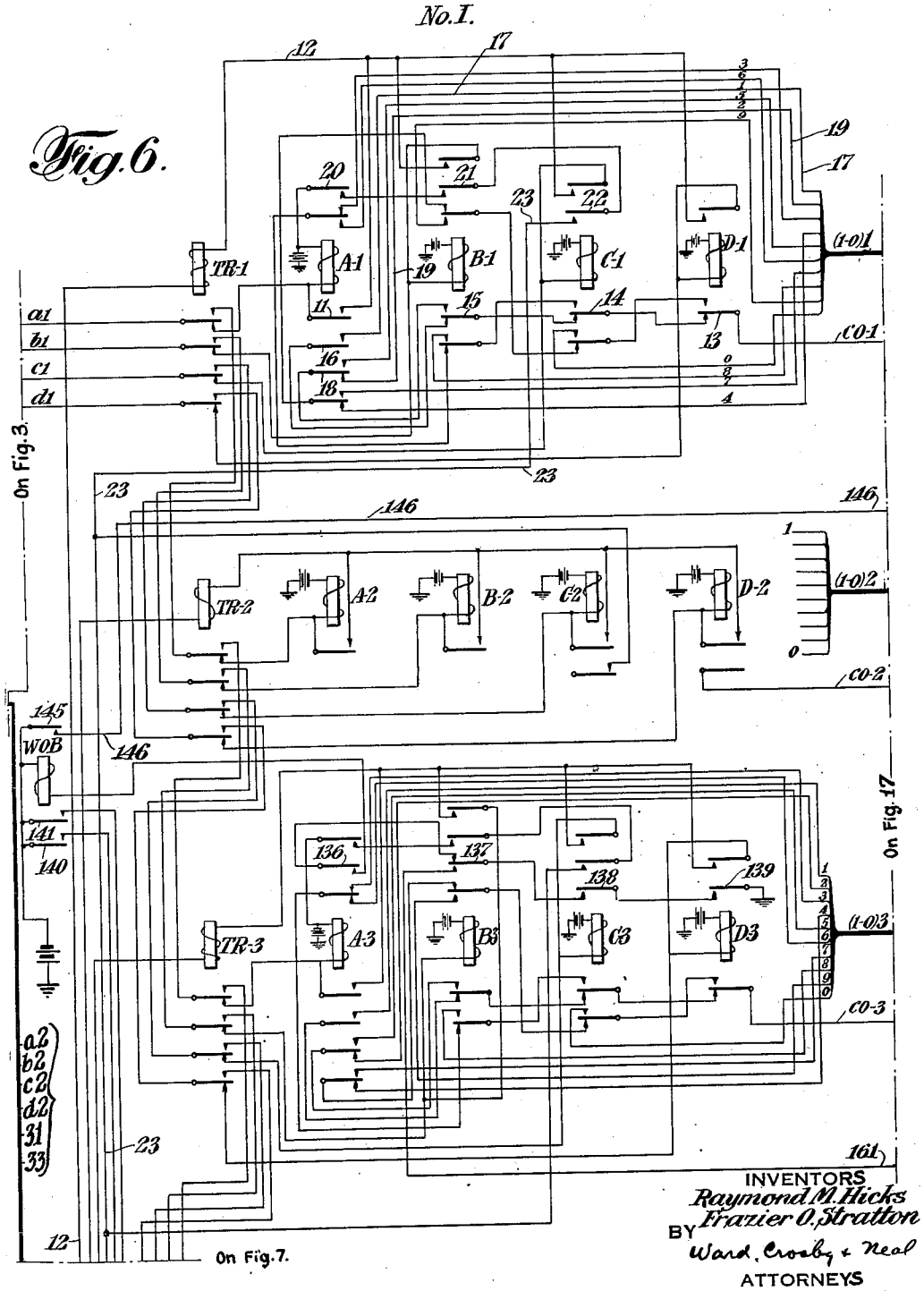

July 7, 1936.  R. M. HICKS ET AL  2,046,381

BID AND ASKED QUOTATION SYSTEM

Filed Dec. 10, 1930  11 Sheets-Sheet 4

INVENTORS
Raymond M. Hicks
Frazier O. Stratton
BY
Ward, Crosby & Neal
ATTORNEYS

July 7, 1936.  R. M. HICKS ET AL  2,046,381
BID AND ASKED QUOTATION SYSTEM
Filed Dec. 10, 1930   11 Sheets-Sheet 6

July 7, 1936.   R. M. HICKS ET AL   2,046,381
BID AND ASKED QUOTATION SYSTEM
Filed Dec. 10, 1930   11 Sheets-Sheet 7

Fig. 10.

INVENTORS
Raymond M. Hicks
Frazier O. Stratton
BY Ward, Crosby & Neal
ATTORNEYS

July 7, 1936.   R. M. HICKS ET AL   2,046,381
BID AND ASKED QUOTATION SYSTEM
Filed Dec. 10, 1930   11 Sheets-Sheet 8

INVENTORS
Raymond M. Hicks
Frazier O. Stratton
BY Ward, Crosby & Neal
ATTORNEYS

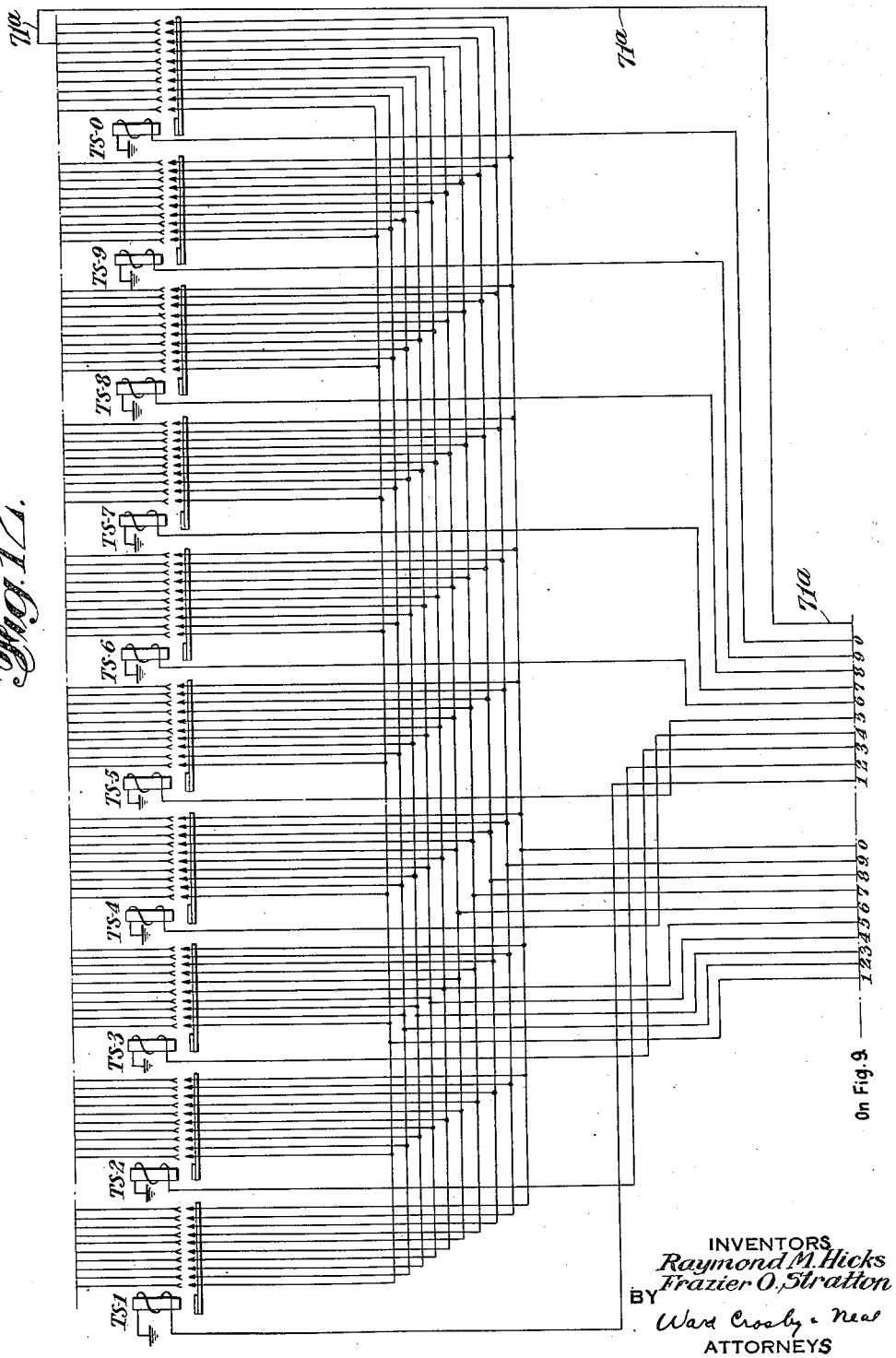

July 7, 1936.  R. M. HICKS ET AL  2,046,381
BID AND ASKED QUOTATION SYSTEM
Filed Dec. 10, 1930   11 Sheets-Sheet 10
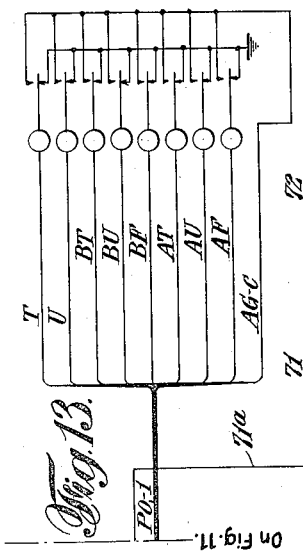
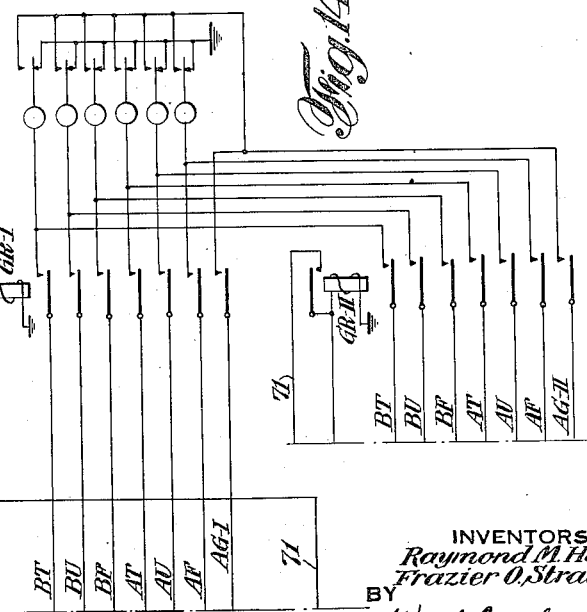
INVENTORS
*Raymond M. Hicks*
*Frazier O. Stratton*
BY *Ward, Crosby - Neal*
ATTORNEYS

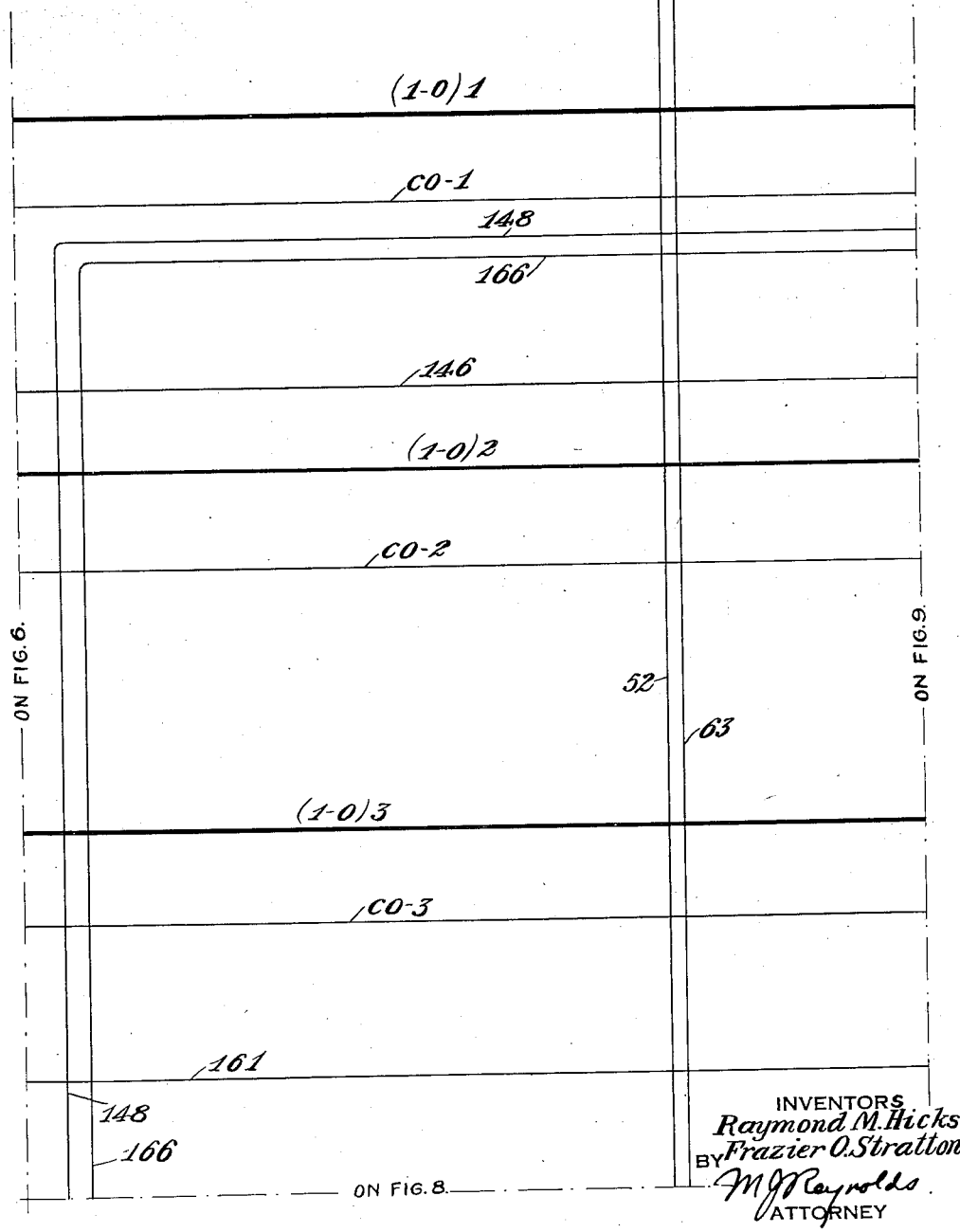

Patented July 7, 1936

2,046,381

UNITED STATES PATENT OFFICE 2,046,381

BID AND ASKED QUOTATION SYSTEM

Raymond M. Hicks, Plainfield, N. J., and Frazier O. Stratton, New York, N. Y., assignors to The Teleregister Corporation, New York, N. Y., a corporation of Delaware Application December 10, 1930, Serial No. 501,242

23 Claims. (Cl. 177—353)

This system has been designed to supply bid and asked quotation service from the floor of the exchange to a quotation room where it will appear on a quotation board.

Among the objects of this invention is the provision of a system for supplying bid and asked quotations. This system may be carried out by mechanism for setting up and transmitting under control of key sets bid and asked quotations from the floor of the exchange to a quotation room from which information may be given to brokers interested in the bid and asked prices of certain particular stocks by telephone or telegraph, etc. thereby avoiding errors attendant to transmission of such information by telephone from the floor of the exchange to the quotation room. The system preferably includes transmission mechanisms which are located outside of the floor of the exchange, and are controlled by key sets from the floor of the exchange, which key sets may be fixedly mounted on a trading post or which may preferably be portable and detachable permitting each of the bid and asked collectors on the floor of the exchange to plug in at any of a plurality of outlets at the trading posts. The system also includes check boards associated with the outlets and controlled in such a manner that the bid and asked prices and code number of the stock quoted are registered on the check board associated with the outlet in which the key set is plugged. This system also includes a plurality of sending mechanisms and seekers associated therewith for connecting any one of the groups of several pairs of groups of storage relays to either of the sending mechanisms, each group of each pair of which is alternately controlled through the instrumentality of an allotter from a key set plugged into the respective outlet, the arrangement being such that a key set plugged in any one of the outlets may control the setting-up operation of any of the groups of bid and asked indicators on the quotation board associated with said trading post, and the code number and the bid and asked prices of the stock on the check board associated with the outlet. Preferably, the indicators are of the type disclosed in the patent to J. B. Ewart, No. 1,979,028, issued October 30, 1934.

Other objects of the invention will be obvious from the description taken in connection with the drawings, in which Fig. 1 is a general diagram of the system;
Fig. 2 is a diagrammatic view of a key set;
Fig. 3 is a diagrammatic view of the allotter;
Fig. 4 shows one of the portable key sets;

Fig. 5 is a chart indicating the relays energized by depression of the various keys;

Figs. 6 and 7 taken together show two storage relay groups, parts of the first of which are detailed out while the second group is shown in the form of a rectangle;

Fig. 10 shows the counting chain of relays and various other relays;

Fig. 12 shows the indicator selecting circuits for selectively energizing the stock selecting relays;

Fig. 13 is a wiring diagram of a check board;

Fig. 14 is a wiring diagram of a group of indicators and a pair of gang relays;

Fig. 15 is a front view of a check board;

Fig. 16 is a front view of a portion of the quotation board, and

Fig. 17 shows various cables and conductors connecting Figs. 6, 8, and 9.

Figure 7:
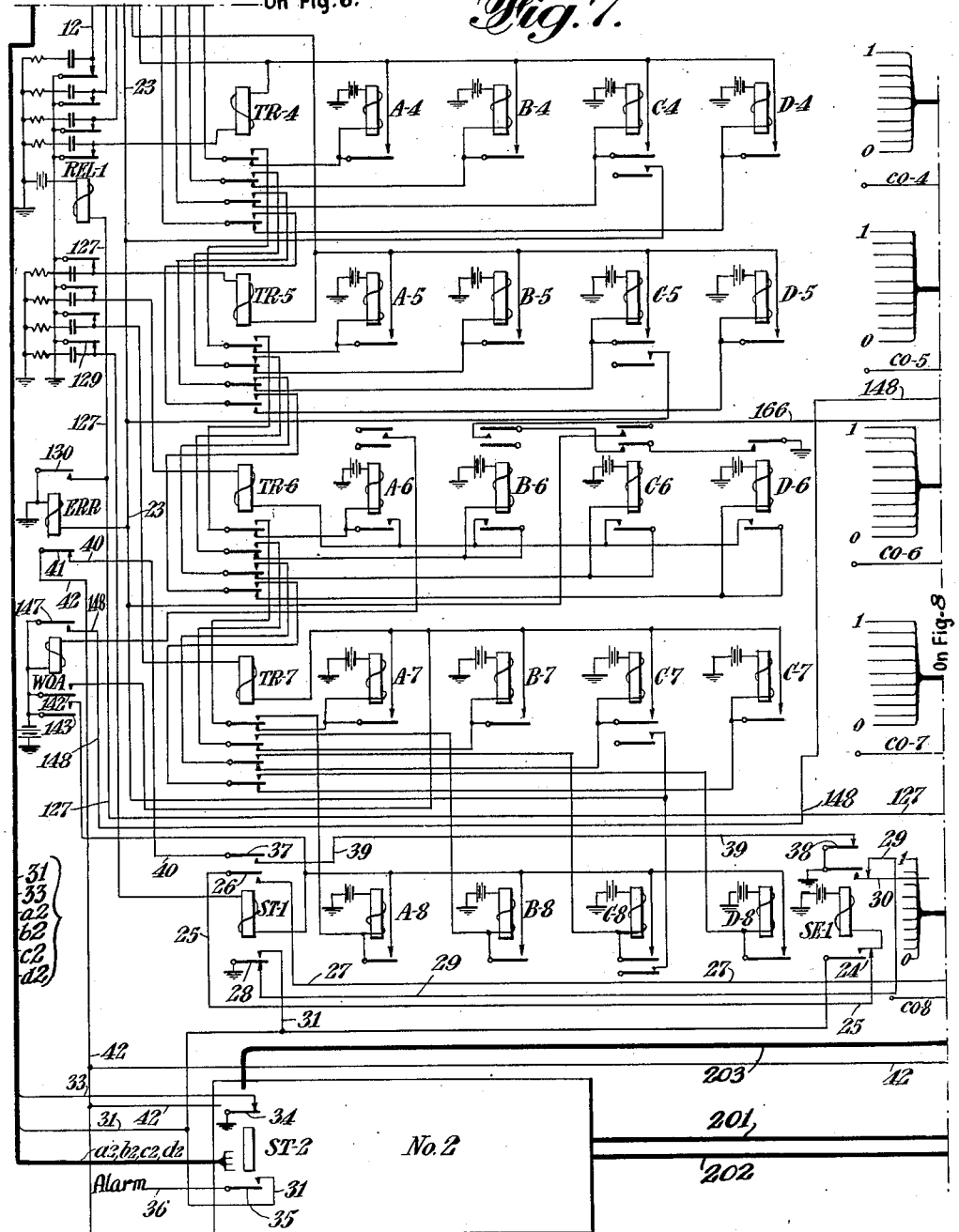

It is the custom at the present time to provide on the floor of the exchange a number of trading posts where bid and asked quotations are received, certain particular stocks being allotted to each post. Information as to bid and asked prices may be obtained by brokers by calling up an operator in a quotation room who gets the information by telephone from an operator at the post to which the particular stock of which the bid and asked price is desired is allocated. The confusion arising from the method of sale effected on the floor of the exchange interferes with giving out this information to the operators in the quotation room, and for the purpose of permitting the quotations to be communicated under better conditions to the operators in the quotation room, we have provided the system herein described. In the quotation room indicated in Fig. 1, in accordance with our system, are as many quotation boards as there are trading posts, in the particular instance shown provision being made for eighteen boards and information as to the stocks on these boards may be obtained from either of two operators assigned to each board. Special stocks are allotted to each board and each of these boards is controlled from a trading post, as shown in Fig. 1, on the floor of the exchange.

The information from the trading post is preferably transmitted under control of key sets of which there may be as many as there are collectors for each trading post, and preferably the construction is such that any one of the key sets may be plugged in at any one of a plurality of jack outlets, three of which are shown in the drawings. Associated with each jack outlet is an allotter which connects the key set to either one of a pair of groups of storage relays each one of which may be connected by means of either of a pair of seekers to control relays in the sending station associated with the particular seeker each of which sending stations may control the setting-up of information on the quotation board and on the check board associated with the jack outlet from which the set-up controlling the indicators is transmitted.

The lines which connect the key sets to the allotters may branch off as indicated at QB—2 to quotation boards in quotation rooms outside of the exchange building from which the operators may transmit by telephone or over a key controlled transmission mechanism such information as brokers may individually desire.

The arrangement of the boards in the quotation room may be such as is indicated in Fig. 1 in which there are preferably three boards side by side, and in which the number of operators for each board is preferably two, the seats for the operators being arranged so that they can readily view their respective boards and read the bid and asked prices.

The key set is preferably made portable on account of lack of space on the trading post and the usual crowded condition on the floor of the exchange, and may be provided with straps so that it may be supported on the bid and asked collector on the floor of the exchange, and the arrangement is such that the key set may be connected to any one of the jack outlets of the various trading posts, should this be found desirable.

The drawings show in detail the first group of storage relays associated with jack outlet number 1, the seekers in their home position with the parts in position to operate seeker number 1, and sender number 1 which is associated with seeker number 1, normalized.

The diagrammatic view of the keyboard as shown in Fig. 2 includes the digit keys 1 to 9 and 0, a blank key BLK, a wipe-out key WO, and an error key ERR. Each of the keys may be provided with a wedge shaped end for closing contacts and may be provided with a spring for returning the key to undepressed position. The arrangement is such that depression of the various keys will connect ground over line G to one or more of a plurality of lines $a, b, c, d$, preferably four in number.

In Fig. 5, the relays operated when the various keys are depressed are indicated by the letter X. Upon depression of the key 1 the line G will be connected to the line $a$. Depression of the key 2 connects lines G to the line $b$. Depression of the key 3 connects line G to line $c$. Depression of the key 4 connects line G to line $d$. Depression of the key 5 connects line G to lines $a$ and $b$, etc.

By depression of any one of the keys in the keyboard any one of the lines $a1$, $b1$, $c1$, and $d1$, Fig. 3, or the lines $a2$, $b2$, $c2$, and $d2$ may be connected to ground under control of the allotter relay ALL—1. When the allotter relay is deenergized, as shown in Fig. 3, the lines $a$, $b$, $c$, and $d$, are connected to the lines $a1$, $b1$, $c1$, and $d1$ so that depression of the keys will control the number 1 storage relay group, shown in Figs. 6 and 7. When the allotter relay ALL—1 is energized lines $a2$, $b2$, $c2$, and $d2$ will be connected to lines $a$, $b$, $c$, and $d$ and the next set-up in the keyboard will be stored in the number 2 storage relay group indicated by a rectangle at the bottom of Fig. 7.

If it is assumed that the allotter relay is deenergized, as shown, then when the key 1 is depressed a circuit will be completed from battery over the coil of relay A—1, Fig. 6, across a normal make and break contact of relay TR—1, over line $a1$, over a normal make and break contact of the allotter relay ALL—1, over line $a$ and the contact of key 1, and over line G to ground. The relay A—1 picks up and closes a holding circuit over a make contact 11, the line 12, the coil of relay TR—1 and over a break contact of relay REL—1, Fig. 7, to ground. Relay TR—1 does not pick up at this time as ground is applied to both sides of it. After the key 1 has been released and ground has been removed from contact 11 of A—1, relay TR—1 will pick up in series with relay A—1 and both relays will be held up as long as the relay REL—1 remains deenergized. The energization of the relay A—1 prepares a circuit from the common line CO—1, over a normal make and break contact 13 of relay D—1, a normal make and break contact 14 of relay C—1, a normal make and break contact 15 of relay B—1, and an operated make contact 16 of relay A—1 to line 17 which is shown at the right hand end of Fig. 6, as the "1" line.

If the key 2 is depressed, instead of key 1, the relay B—1 will pick up and connect the common line CO—1 across the normal contacts 13 and 14, the operated contact 15, and the normal make and break contact 18 of relay A—1 to line 19 which is shown at the right hand end of Fig. 6 as the "2" digit line.

By depressing any of the various keys, various relays will pick up as indicated in Fig. 5, the relays of the first section comprising the relays A—1, B—1, C—1, and D—1 being controlled by the digit keys to connect the common line CO—1 to digit lines (1 to 0) 1 corresponding to the keys depressed. This section of relays constitutes the tens stock number section of relays and does not contain any circuits controlled by either the blank or the wipe-out keys but is provided with a circuit that may be closed by depression of the error key. When the error key ERR is depressed it causes the relays A—1, B—1, and C—1 to pick up which connect battery over an operated make contact 20 of relay A—1, an operated make contact 21 of relay B—1, and an operated make contact 22 of relay C—1 over the line 23 which, as shown in Fig. 7, extends about the coil of relay ERR to ground. The function of this relay will be referred to later. This circuit may be made in any section of any of the relay groups.

After any information has been set up in this section of relays, and after the key controlling this setting-up operation has been released, relay TR—1 will pick up in series with the relays of this section and switch lines $a1$, $b1$, $c1$, $d1$ into the next or second section comprising the relays TR—2, A—2, B—2, C—2, and D—2. The next depression of a key will cause the appropriate relays in this section to pick up and to connect the CO—2 line of this section to one of the digit lines (1 to 0) 2 or battery to the line 23. After release of the key the relays picked up will be held up over a line extending over the coil of relay TR—2 and over a break contact of relay REL—1, Fig. 7, to ground. This section constitutes the units stock number section of relays.

Relay TR—2 shifts the connection so that ground applied to the lines a1, b1, c1, and d1 will cause energization of the corresponding relays A—3, B—3, C—3, and D—3 of the third or "bid tens" section causing various circuits to be prepared from the common line CO—3 to the various digit lines (1 to 0) 3. Upon release of the key the relays energized will lock to the line extending over the coil of relay TR—3 and a break contact of relay REL—1, Fig. 7, to ground.

Relay TR—3 will shift the connection so that the next depression of the key will cause one or more of the relays A—4, B—4, C—4, D—4 in Fig. 7 in the fourth or "bid units" section of relays to pick up and to prepare various circuits, as described above, from the CO—4 line to the various digit lines (1 to 0) of this section and to lock on a line which is extended about the coil of the relay TR—4 and a break contact of relay REL—1 to ground. As the key is released the relay TR—4 will pick up and shift the connections so that depression of the next key will control the fifth or "bid fractions" section of relays indicated by A—5, B—5, C—5, and D—5. Energization of one or more of these relays will connect the line CO—5 to one of the digit lines (1 to 0) 5 of this section and will also prepare a holding circuit over the coil of relay TR—5 and a break contact of relay REL—1 to ground.

Relay TR—5 picks up upon release of the key and switches the connections so that depression of the next key will control the relays A—6, B—6, C—6, and D—6 of the sixth or "asked tens" section of relays to prepare circuits from the line CO—6 to the digit lines (1 to 0) 6 and to prepare a holding circuit for itself across the coil of relay TR—6 and the break contact of relay REL—1 to ground.

As before, the relay TR—6 will pick up upon release of the depressed key and switch the connections from the key set to the seventh or "asked units" section of relays A—7, B—7, C—7, and D—7. These relays prepare circuits from the line CO—7 to the digit lines (1 to 0) 7 of this section, and close a holding circuit over the coil of relay TR—7 and a break contact of relay REL—1 to ground. As the key is released relay TR—7 will pick up and switch the connections to the eighth or "asked fractions" section of relays A—8, B—8, C—8, and D—8 which, when energized, will connect the line CO—8 to the various digit lines (1 to 0) 8 of this section.

As the key is released a holding circuit will be made over a make contact of the operated relay and the coil of the relay ST—1 and a break contact of relay REL—1 to ground. As the relay ST—1 picks up it connects battery over the coil of relay SE—1, a normal break after make contact 24 of this relay, line 25, the operated make contact 26 of relay ST—1, and line 27, to the number 1 contacts of the number 4 bank of the rotary switches in each of the seekers shown in Fig. 8.

Figure 8:
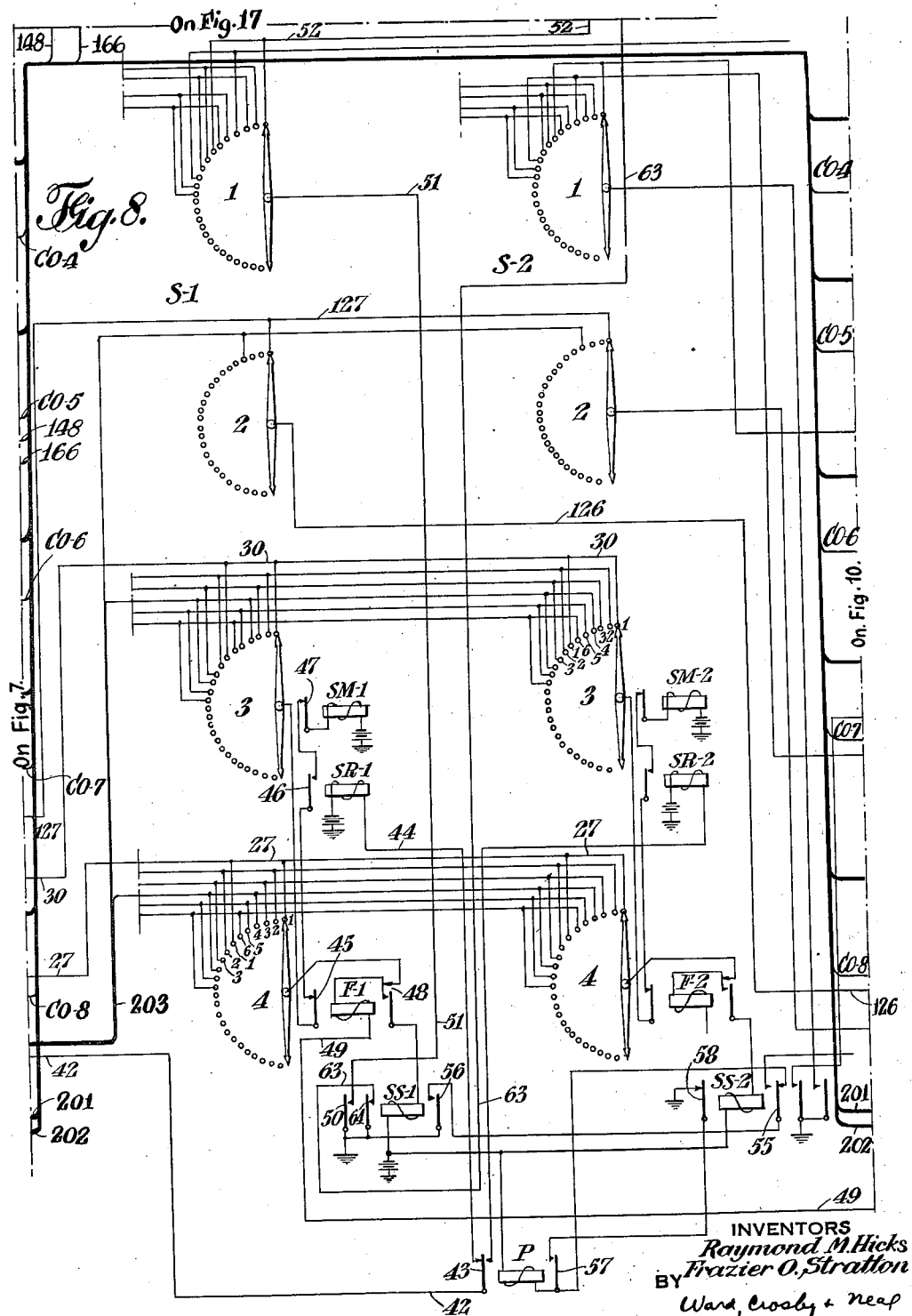
Fig. 8 shows a pair of seekers.

The relay ST—1 removes ground at its operated make and break contact 28 from line 29 connected by a break after make contact of relay SE—1 to line 30 connected to the first fixed contact of the number 3 bank of rotary switches in each of the seekers S—1 and S—2, Fig. 8.

The relay ST—1 at its operated make and break contact 28 applies ground to the line 31 which, as shown in Fig. 3, is a ground terminal for the allotter relay ALL—1. The operation of this relay disconnects lines a1, b1, c1, d1 from lines a, b, c, and d, and connects lines a2, b2, c2, d2 to lines a, b, c, and d so that upon subsequent depression of the keys of a key set plugged in at the same jack outlet the storage relay group number 2, Fig. 7, will be controlled. The relay ALL—1 closes its make contact 32 connecting the ground terminal of this relay to line 33 which, in Fig. 7, is shown as connected across a normal break contact 34 of relay ST—2 to ground. The relay ALL—1 therefore will be held up over the contact 34 of relay ST—2 irrespective of the energization of the relay ST—1. The next set-up made through the same jack outlet will control storage relay group number 2 regardless of whether or not set-ups were made in any of the pairs of storage groups associated with the other jack outlets.

A circuit is also prepared over the operated make and break contact 28 of relay ST—1, line 31, to a make contact 35 of relay ST—2. When relay ST—2 is energized the circuit will be extended to line 36 which may operate a storage relay alarm to signify that both storage groups are filled and that another quotation cannot be set up until the alarm ceases.

*Operation of the seekers in selecting a storage relay group*

Energization of the relay ST—1 at its make contact 37 connects ground over a break contact 38 of relay SE—1 and line 39 to line 40 and over a break contact 41 of relay ERR to line 42 which, as shown in Fig. 8, extends over the normal make and break contact 43 of relay P to the line 44 thus applying ground to the relay SR—1.

As described above, ground has been removed from the first contact of the number 3 bank of the rotary switches but if the setting-up operation had been made in storage relay group number 2 then ground would be removed, according to the wiring scheme, from contact number 4 and ground would be applied to all the other five contacts of each series of six contacts, there being one contact for each storage group of relays as indicated in Fig. 1 so that the seekers may connect any one of the six groups of storage relays to either of the senders.

If the switch arms of the seekers were in any other position from that indicated then ground from the break contacts of ST—2, ST—3, ST—4, ST—5, and ST—6 not operated would, through the contacts which the seeker arms number 3 engage, connect ground across the seeker arm, a break contact 45 of relay F—1, an operated make contact 46 of relay SR—1 and a break contact 47 of relay SM—1 to one terminal of the coil of relay SM—1 to the other terminal of which battery is applied. This would cause the relay SM—1 to operate and upon release to step the various seeker arms 1, 2, 3, and 4, of seeker S—1, forwardly to the next contacts. As the relay SM—1 energizes it breaks its own circuit at the break contact 47 to operate the seeker arms in a step-by-step movement, as is well understood.

When the number 1 groups of relays are operated and the seekers are in the position shown, ground will not be applied to the magnet SM—1 and the seeker arms will remain in the position shown.

The break contact 45 of relay F—1 is operated by energization of the relay F—1. As battery was applied to the line 27 which is connected to the first contacts of the bank 4 of the seekers, it continued over a break after make contact 48 of relay F—1, the coil of the relay F—1, and line 49 which on Fig. 10 is connected over the break contact 49 of relay RLS—1 to ground.

As the relay F—1 picks up it opens the circuit to the stepping magnet SM—1 and switches its own winding in series with the relay SS—1 through the make before break contact 48 of relay F—1, thus operating the relay SS—1.

Figure 9:
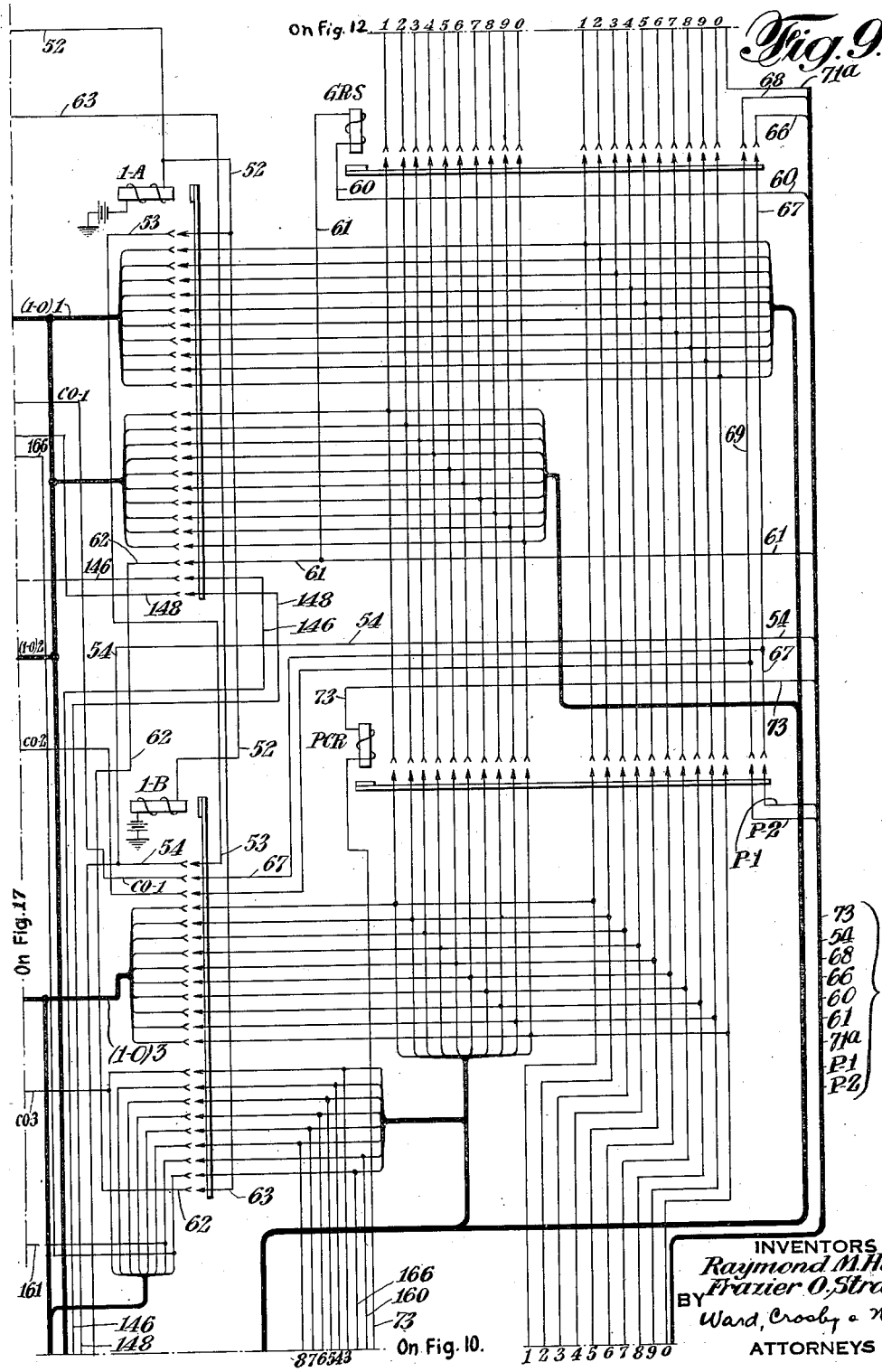
Fig. 9 shows a portion of the indicator selecting and code transmitting circuits.

The relay SS—1 applies ground over its make contact 50 to line 51, and over the switch arm of bank number 1 of the seeker to line 52 which is the ground line for the relays 1—A and 1—B, Fig. 9. These relays pick up in parallel through the number 1 bank and wipers to ground on relay SS—1. This same ground on line 52 is connected across a contact in relay 1—A to line 53, across a contact in relay 1—B, and line 54 to one terminal of the relay PQ—1, Fig. 11. As the relay PQ—1 picks up it connects the pulsing leads T, U, BT, BU, BF, AU, AT, and AF and the actuation ground AG—2 for post outlet number 1, PO—1, to the sender number 1, which is the one disclosed in the drawings.

As the relay SE—1 picks up in series with the relay F—1 over line 27 it places ground on the line 30 and thus grounds the first contacts in both seekers in bank number 3 thus busying this bank contact number 3 to the switch arm number 3 of seeker S—2. The relay SE—1 also locks to ground over its make before break contact 24 and the contact 28 of relay ST—1 and removes battery from the line 27 which leads to the number 4 banks of both seekers.

The relay P is operated from battery over a normal break contact 55 of relay SS—2 and a make contact 56 of relay SS—1 to ground. As the relay P operates it closes a holding circuit over its own contact 57 and over a contact 58 of relay SS—2 to ground. It also operates the make and break contact 43, and disconnects the SR—1 relay from the line 42 coming from all of the groups of storage relays and connects this line to the SR—2 relay in seeker S—2. This is to control the alternate operation of seekers S—1 and S—2. Seekers S—2 will be operated next regardless of which group of storage relays receives the next set-up.

*Start of the sender*

Figure 11:
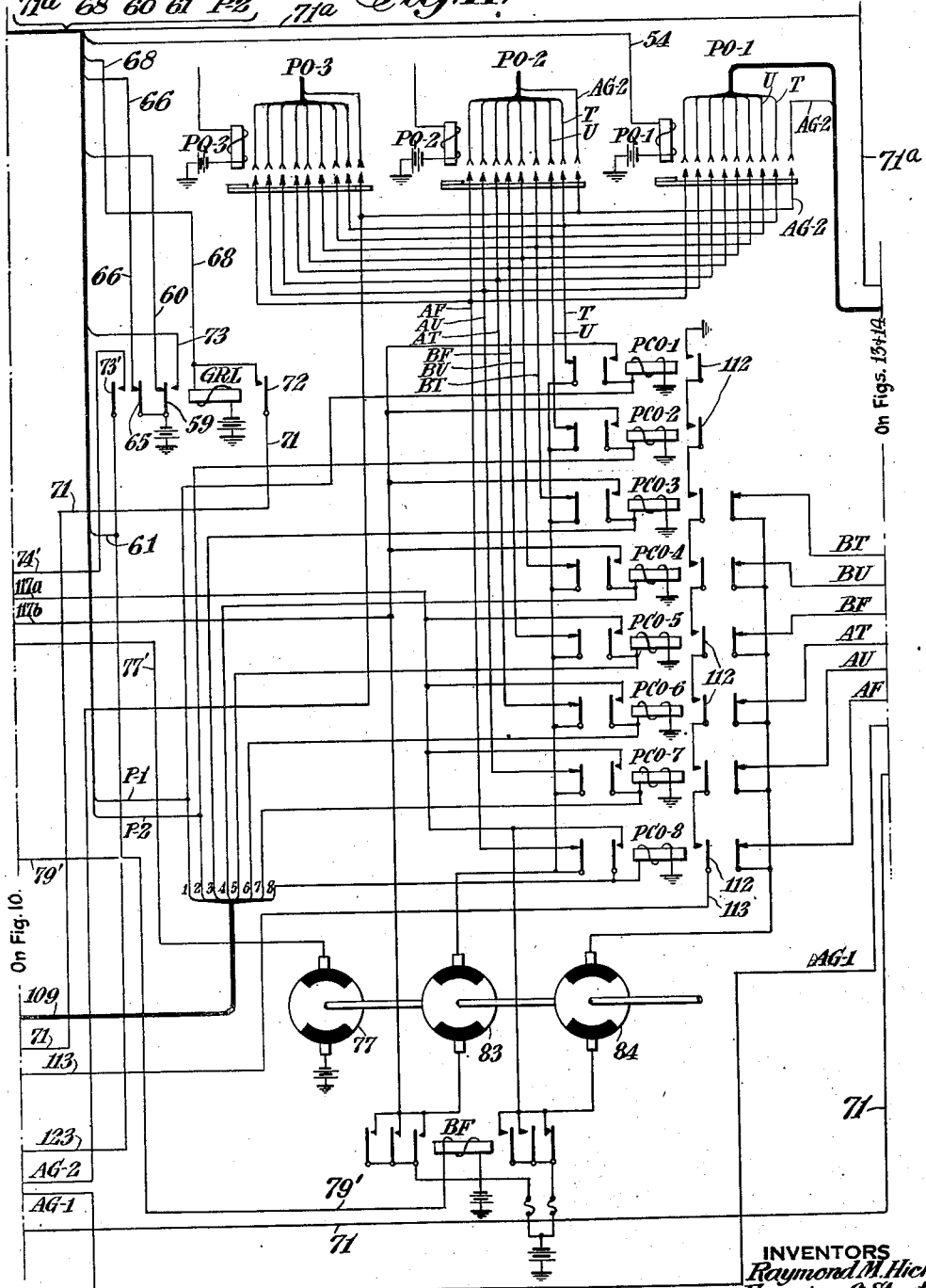
Fig. 11 shows the impulsing means, check board, selecting relays and impulse cut-off relays.

After the relays 1—A and 1—B, Fig. 9, have picked up a circuit will be completed from battery, across the normal make and break contact 59 of relay GRL, Fig. 11, over line 60, coil of relay GRS, Fig. 9, over line 61, across a make contact in relay 1—A, over line 62, across a make contact in relay 1—B, line 63, which is grounded over an operated make contact 64, Fig. 8, of relay SS—1. The relay GRS picks up and connects the various lines 1 to 0 from the storage relays "—1" and "—2" to lines which run to the selecting mechanism in Figs. 12 and 14. The relay GRS also through one of its make contacts connects battery which is connected across a break contact 65 of relay GRL, to line 66, which is connected across an operated make contact of relay GRS to line 67 connected across an operated contact of relay 1—B to the CO—1 line. The battery on line CO—1 continues across the various make and break contacts of the tens stock number section "—1" to one of the lines (1 to 0) 1 which is extended across one of the make contacts of relay 1—A and across a make contact of relay GRS to one of the tens selecting relays TS—1 to TS—10 (Fig. 12), causing this relay to pull up and connect the (1 to 0) 2 lines from the "—2" group to the appropriate gang relays GR—1, Fig. 14.

The relay GRS also connects battery over the coil of relay GRL and line 68, over a make contact of relay GRS to line 69 connected across a make contact of relay 1—B to the CO—2 line of the units stock number section. Battery is extended from this line across the make and break contacts of the relays of section "—2" to one of the lines (1 to 0) 2. From this section of relays the circuit is extended across a make contact of relay 1—A, across a make contact of relay GRS and across a make contact of an operated TS relay and a line 71a to one of the GR relays. The GRL and the GR relays operate in series. As the GRL relay pulls up it closes a holding circuit across its coil, across its make contact 72, line 71, a break contact 70 of relay RLS—1, Fig. 10, line 71, which is connected across a make contact 72 of relay GR—1, Fig. 14, and the coil of relay GR—1 to ground. By this means the GRL and the GR relays will be locked to ground in series. The operation of the GR relay effects selection of the desired group of indicators.

The GRL relay opens the circuit for the GRS relay at its contact 59 and also opens the circuits at break contact 65 across the CO—1 line causing the tens relay TS—1 to TS—0 to release. The GRS relay in releasing, opens the operating path 68 to GRL and GR relays, but these relays remain operated over the holding circuit over line 71.

As the relay GRL pulls up it applies battery over its make contact 59 to line 73 which is extended across the relay PCR, Fig. 9, and across a break contact 74 of relay RLS, Fig. 10, to ground. This causes the relay PCR to pick up.

Relay GRL also connects at its contact 73', Fig. 11, the line 61 which is grounded over make contact 64 in relay SS—1, to the line 74' which is connected across a break contact 75, Fig. 10, of relay ACT—L and across a break contact 76 of relay SW and across the coil of relay ST to battery. This causes the relay ST to pick up and to prepare an operating circuit over the relay PP—1 from the interrupter 77, line 77', across make contact 78 of relay ST, a normal make and break contact 79 of relay PP—2, and the coil of relay PP—1 to ground. The first pulse across the pulsing cam 77 causes the relay PP—1 to pick up. As the relay PP—1 picks up it closes a circuit from battery across the coil of relay BF, Fig. 11, over line 79', and across the make contact 80 of relay PP—1 to ground. At the end of the pulse the relay PP—2 operates in series with the relay PP—1 from battery on a make contact 81 of relay ST and make contact 82 of relay PP—1. Relay PP—2 does not operate prior to this since its winding is short-circuited by the pulsing cam. The operation of the BF relay places battery on the indicator pulsing cams 83 and 84, over its make contacts and restoration impulses are sent to the indicators in the selected position of the quotation board and to the proper check board through break contacts of relays PCO—1 to PCO—8.

*Operation of the counting chain*

As the first restoration impulses go out over the pulsing cams 83 and 84, an impulse goes out of the pulsing cam 77, across the make contact 78 of relay ST, the operated make and break contact 79 of relay PP—2 to line 85, a normal break contact 86 of relay X, normal make and break contact 87 of relay W, normal break contact 88 of relay Y, and the coil of relay I to ground. Relay I picks up and closes a circuit over its make contact 89, across the coil of relay W, through break contact 90 of relay X, line 91, across a normal make and break contact 92 of relay SW to battery. After the pulse ceases the relay W operates in series with relay 1 being short-circuited prior to this time by the battery from interrupter or pulsing cam 77.

On the second pulse battery from the pulsing cam 77 through make contacts of relay ST and PP—2, break contact 86 of relay X, the operated make and break contact 87 of relay W, and the coil of relay 2 to ground. The relay 2 closes a locking circuit in series with the relay X, over a break contact 93 of relay Y to the line 91. At the end of the pulse the relay X operates and at its break contact 90 releases relays 1 and W.

On the third pulse battery continues over a normal make and break contact 94 of relay Y, and an operated make contact 95 of relay X, and operates the number 3 relay. As the relay 3 picks up it closes a locking circuit in series with relay Y over a normal make and break contact 96 of relay W to the battery line 91. The relay Y operates at the end of the impulse and releases relays X and 2.

On the fourth pulse battery over the pulsing cam 77, as before, through the operated make and break contact 94 of relay Y, a break contact 97 of relay W operates the relay 4. Relay 4 closes a locking circuit in series with W through the break contact 90 of relay X to the battery, line 91, as before. The relay W operates at the end of the pulse and releases relays Y and 3.

On the fifth pulse battery as before through the break contact 86 of relay X and the operated make and break contact 87 of relay W operates the number 2 counting relay. Relay 2 closes a locking circuit in series with relay X and break contact 93 of relay Y to battery as before. The relay T operates through a break contact 98 of relay U, a make contact 99 of relay 2, break contact 100 of relay 1 and a make contact 96 of relay W to the battery on line 91. The relay T closes a locking circuit in series with relay U to the holding line 91. Relay X operates at the end of the pulse and releases W and 4. The release of relay W removes the short-circuit from the relay U and allows it to operate in series with T.

On the sixth pulse battery as before through a break contact 94 on Y, make contact 95 on X operates relay number 3. Relay 3 closes a locking circuit in series with Y and the break contact 96 of relay W to the line 91. At the end of the pulse the relay Y operates and releases relays X and 2.

On the seventh pulse battery as before through the make contact 94 of relay Y, break contact 97 of relay W operates relay 4. Relay 4 closes a locking circuit in series with relay W, over its contact and the normal break contact 90 of relay X to the holding line 91. At the end of the pulse relay W operates and releases Y and 3.

On the eighth pulse battery as before through a break contact 86 of relay X, a make contact 87 of relay W operates relay 2. Relay 2 closes a holding circuit in series with the relay X and the normal break contact 93 of relay Y to the line 91. The relay V operates through the make contact 98 of relay U, to make contact 99 of relay 2, break contact 100 of relay 1, and the operated contact 96 of relay W from battery on line 91. The relay V over its own contact 101 locks to the line 91. Relay X operates at the end of the pulse and releases relays W and 4.

On the ninth pulse battery as before through a break contact 94 of relay Y, make contact 95 of relay X operates the 3 relay. Relay 3 closes its locking circuit in series with the relay Y over the break contact 96 of relay W to line 91. The relay Y operates at the end of the pulse and releases relays X and 2.

On the tenth pulse battery as before through make contact 94 of relay Y and a break contact 97 of relay W operates the 4 relay. This relay closes a locking circuit in series with relay W over its own contact and a break contact 90 of relay X to the line 91. Relay W operates at the end of the pulse and releases relays Y and 3.

*End of the restoration pulses*

Relay RCO operates from battery across the make contact 81 of relay ST, line 102, operated make contact 103 of relay V, operated make contact 104 of relay 4, line 105 which extends about the coil of relay RCO to ground. As the relay RCO picks up it closes a locking circuit from battery over its own contact 106 and contact 107 of relay PP—2. As the relay RCO picks up it connects battery over its make contacts 108 to the energizing leads cabled at 109 for the relays PCO—1 to PCO—8, Fig. 11. These relays open the pulsing leads to the indicators in the check board and in the quotation room cutting off the pulses to the indicators. The relays PCO—1 to PCO—4 and PCO—5 to PCO—8 close holding circuits over separate contacts of the relay BF and over lines 117a and 116 and line 117b and contacts 117 and 117c of relay SW to battery. The relays PCO—1 to PCO—8 also connect ground over the contacts 112 to line 113 which is the ground lead for the relay SW. Relay SW picks up and at its break contact 76 opens the circuit for the relay ST and at its contacts 92 opens the holding circuit over line 91 to relays 4, W, U, V, and T allowing them to release. Relays ACT and ACT—L operate in parallel from ground on the break contact 74 of relay RLS over line 73 to battery over line 119 through the make contact 92 of relay SW and lock to battery on the make contacts 114 of ACT—L. The release of the relay ST opens the circuit to the relays PP—1 and PP—2 in series allowing them to release. The release of relay PP—1 opens the circuit to relay BF allowing it to release. Release of relay BF removes battery at one point from the holding circuits of relays PCO—1 to PCO—8. Release of the relay PP—2 opens the locking circuit of relay RCO at its contact 107 and allows it to release which opens the circuits to PCO—1 to PCO—8 relays allowing them to release. Release of the PCO relays removes ground from the relay SW allowing it to release.

*Actuation*

The relay AG, Fig. 10, operates from the ground on the break contact 74 of relay RLS over line 73, coil of relay AG, line 115, contact of the relay ACT, line 116 to battery on a break contact 117 of relay SW and locks to battery over contact 118, line 119 and make contacts 114 of relay ACT—L. The relay ST operates over the break contact 76 of relay SW, line 121, and make contact 122 on the relay AG, line 123, and lines 61, 62, and 63 to a ground on the make contact 64 of the relay SS—1 in the seeker. Operation of the relay AG applies ground to the actuation circuits AG—1 and AG—2 of the indicators at the posts and in the quotation room. The GR—1 ground in Fig. 14 is indicated by GR—I to distinguish it from the GR—II ground applied over sender II. Either sender may operate each of the stocks.

The relay ST prepares a circuit for the relay PP—1 through the break contact 79 on the relay PP—2 and the make contact 78 on the relay ST and line 77' to the control pulsing cam 77. The first pulse, after this circuit is prepared, operates the PP—1 relay and the PP—2 relay operates in series with the PP—1 relay at the end of the pulse through make contact 82 on the relay PP—1 and the make contact 81 of the relay ST to battery. The BF relay operates from ground on the make contact 80 of the relay PP—1 placing battery on the indicator pulsing cams 83 and 84.

The next pulse from the control pulsing cam 77 operates the number 1 counting relay as previously explained. The next pulse will operate the number 2 relay, and the next pulse the number 3 relay, etc. As the counting chain relays are operated they connect battery which is extended over the make contact 81 of relay ST to line 102, over make contacts of the operated relays to the digit lines 1 to 0 of which the lines 1 to 9 are extended over the make contacts of the relay ACT, on the other side of which the lines 1 to 9 and the 0 line, 105, are connected over the PCR relay, Fig. 9, and the 1—A relay to the lines (1 to 0) 1 and (1 to 0) 2 of the storage selection sections "—1" and "—2", Fig. 6. The lines 1 to 0 are also extended across the relay 1—B on the other side of which they are multiplied to the various lines 1 to 0 of the sections "—3" to "—8".

As battery is applied by the counting chain relays to these various digit lines it will be extended across the sections of relays and the lines CO—1 to CO—8 to the PCO—1 to PCO—8 relays, depending upon which of the digit lines are connected to the respective CO lines.

If we assume that the code number "12" is set up in the sections "—1" and "—2" then as battery is applied to the "1" line in the counting chain it is extended across a contact of the ACT relay, across a contact of the PCR relay, across a contact of the 1—A relay, to line 1 connected in the section "—1" to the CO—1 line which is connected across the relay 1—B, line 67, and relay PCR, to the energizing lead P—1 for the PCO—1 relay. The PCO—1 relay will pick up and disconnect the line T extending to the tens code indicator in the check board from the pulsing cam 83 so that no other pulses will go to this wheel and the wheel will remain in the 1 position.

As the second pulse is counted in the counting chain battery will be applied to the "2" line which will continue over the ACT relay, PCR relay, the 1—A relay, to line 2 of the 1 to 0 line of which the "2" line is connected across the group "—2" to the line CO—2 which is connected across the relay 1—B, relay PCR, to the energizing lead P—2 for the relay PCO—2. As this relay picks up it disconnects the pulsing line for the units stock code indicator from the pulsing cam 83. The result of this operation is that the code "12" is now set up in the code indicators in the check board.

If we assume that the bid price set up in the sections of relays "—3", "—4", and "—5" is 345, and that the asked price 367 is set up in sections "—6", "—7", and "—8", as the third impulse is counted in the counting chain battery will be extended over line 3, contact of relay ACT, contact of relay 1—B, and will continue across the group "—3" to line CO—3 which is connected across the relay 1—B to the energizing lead of the relay PCO—3. The relay PCO—3 picks up and prevents further impulses from going out over the lines BT to the tens indicator wheels of the check board and quotation board for the bid prices.

As the fourth impulse is counted in the counting chain battery will be extended over the various relays, as stated before, across contacts of the section "—4" to the line CO—4 which is the energizing lead for the relay PCO—4. As the relay PCO—4 picks up it disconnects the line extending to the units indicator of the bid indicators in the check board and in the selected stock on the quotation board. Impulses to this indicator wheel will be discontinued.

As the fifth impulse is counted in the counting chain battery will be applied through the "—5" section of relays to the CO—5 line which causes the relay PCO—5 to pick up and disconnect the line extending to the fractions bid indicator wheel in the check board from the pulsing cam 83 and disconnect the line BF over which the fractions wheel of the bid price in the selected indicator on the stock quotation board is operated from the pulsing cam 84.

As the tens of the asked price is the same as the tens of the bid price, and as the PCO—3 relay operated when the number 3 counting relay was operated, the relay PCO—6 also operated to prevent further impulses from being sent to the tens wheel of the asked indicators on the check board from the cam 83 and to prevent further impulses from being sent from the cam 84 to the tens wheel of the asked indicators on the quotation board.

As the sixth impulse goes out the counting chain relays apply battery to the "6" line which in the assumed problem is connected over the section "—7" to the line CO—7 which causes the relay PCO—7 to pick up. As the relay PCO—7 picks up it disconnects the pulsing line to the units wheel of the asked indicators on the check board from the cam 83 and disconnects the pulsing line AU leading to the units indicator wheel of the asked price on the quotation board from the cam 84.

As the seventh impulse goes out the battery placed on line 7 by the counting chain will be extended over the contacts of the section "—8" to the CO—8 line which is connected to the energizing lead of the PCO—8 relay. This relay picks up, disconnects the pulsing line AF for the fraction wheel of the asked price on the check board from the pulsing cam 83 and disconnects the line AF which leads to the fractions wheel of the asked indicators on the quotation board from the pulsing cam 84.

The code number "12" has now been set up in the check board associated with the jack outlet to which the key set was connected and the bid price 345 and the asked price 367 have also been set up on the bid and asked indicator wheels of the check board. On the quotation board the same information, except the code, has been set up, the name of the stock being preferably indicated by a tag as is well understood.

After the necessary impulses have been transmitted in the example assumed when the seventh impulse has been transmitted ground will be made over the contacts 112 of the relays PCO—1 to PCO—8, to the line 113 which is the ground line for the relay SW so the relay SW will pick up as soon as all the necessary impulses have been transmitted.

*Release of the sender*

The ground that was established across the contacts of the PCO relays to operate the SW relay is extended across a make contact 124 of relay AG to operate the release relay RLS. The relay RLS over one of its make contacts locks to ground over the line 63 and the contact 64 of the relay SS—1 in the seeker. The relay SW opens the circuits for the relays PCO, the relay ST, and the relays of the counting chain so that these relays may be released.

As the relay RLS picks up it opens at its contact 70 the circuits of the GRL and GR relays and at its contact 74 opens the circuits for the PCR, ACT—L, ACT and AG relays which causes them to release. The relay ST opens the circuit for the PP—1 and PP—2 relays in series causing them to release. The release of the AG relay opens the locking circuit of the SW relay allowing it to release. The release of the PP—1 relay opens a circuit for the BF relay allowing it to release.

*Release of seeker and storage relay groups*

The operation of the relay RLS in the sender at its make contact 125 applies ground to the line 126 which is connected in bank 2, Fig. 8, of the seeker to line 127 which is the ground line for the relay REL—1, Fig. 7. As the relay REL—1 picks up it removes ground from the various TR and A, B, C, D, relays of the storage group allowing these relays to release. The relay RLS also removes ground at its contact 128 from the line 49 which is the ground line for the relays F—1 and SS—1 in seeker S—1, Fig. 8, causing these relays to release. As the relay REL—1 operates it opens at its contact 129 the circuit of the relay ST—1 and allows this relay to release. Release of the ST—1 relay opens at its contact 28 the circuit of the SE—1 relay allowing it to release. Release of the SS—1 relay opens the circuit of the 1—A, 1—B and PQ relays allowing them to release. The release of the relay SS—1 disconnects ground from the line 63 which is the ground line for the relay RLS and causes the relay RLS to release. The release of the relay RLS removes ground from the relay REL—1 and causes this relay to release.

*Error*

Depression of the error key applies ground to the leads A, B, and C. This ground through the break contacts of the last of the TR relays operated is extended to the associated storage section which is ready to receive the next digit and respectively to the relays A, B, and C of that section. As the relays A, B and C, of section "—1" for example, operate they connect battery over a make contact 22 of relay C to the line 23 which is connected over the coil of relay ERR to ground. As the relay ERR picks up it applies ground over its contact 130 to the ground line 127 of the relay REL—1 which, as stated before, causes the release of all the relays in the associated storage group.

If the ERR relay is operated in place of the final digit in section "—8" which causes a circuit to be established in the SR relays it will break this circuit at its contact 41, thus preventing the seeker from hunting for a group of storage relays in which information has been set up.

*Wipe out*

Depression of the wipe-out key, after the setting up of the stock code in sections "—1" and "—2", grounds key leads A, C, and D causing the relays A—3, C—3 and D—3 to pick up. As these relays pick up they complete a circuit from battery over the coil of relay WOB, make contact 136 of relay A—3, break contact 137 of relay B—3, make contact 138 of relay C—3, and make contact 139 of relay D—3 to ground. The relay WOB operates and at its make contact 141 completes a circuit for the relay TR—4 and at its make contact 140 completes a circuit for the relay TR—5. As the relays TR—4 and TR—5 pick up they transfer the leads from the keys to the section "—6" so that when a key is depressed no information will be set up in sections "—4" and "—5". This operation permits a quotation to be written with no bid information.

A second depression of the WO key again grounds the leads A, C, and D causing the relays A—6, C—6, and D—6 to pick up. These relays complete a circuit for the relay WO—A which in turn picks up and operates the relays TR—7 and ST—1 over its contacts 142 and 143, the relay ST—1 starting the seeker. In this case the seeker action is exactly the same as before, and the sender action through restoration is also the same so that the bid and asked prices will be erased from the appropriate check board and the selected indicators.

The relay WOB at its make contact 145 applies battery to the line 146 which is extended across a make contact in relay 1—A to the coil of the relay WO—1 causing this relay to pick up.

The relay WOA connects battery over its make contact 147 and line 148, contact of relay 1—A to the coil of relay WO—2, causing this relay to pick up.

The relay ACT—L which, as stated before, operates after restoration places battery over its make contacts 150 and 114 and lines 152 and 153 which are extended across make contacts of the relays WO—1 and WO—2 to the energizing lines in cable 109 for the relays PCO—3 to PCO—8 holding these relays operated. This prevents actuation impulses from being sent out to the various bid and asked wheels on the check board and on the selected stock on the quotation board.

The relay RLS operates from ground over the contacts of the various relays PCO—1 to PCO—8, line 113, a contact 155 of relay WO—1, and a contact 156 of relay WO—2. Operation of the relay RLS releases the sender, the seeker and the storage relay groups as before.

In the case where the WO key is depressed but once after the stock code has been entered, and then the asked price information is set up in sections "—6", "—7" and "—8", the action will be normal except that WOB will cause the relay WO—1 to pick up and that when relay ACT—L operates it applies battery on the contacts of the relay WO—1, thus holding the relays PCO—3, PCO—4, PCO—5 operated during actuation, thus leaving the bid indicator wheels blank.

In cases where the bid information is set up and then the WO key is depressed the action will be the same as above, except that the WO—A and WO—2 relays will be operated, thus holding the PCO—6, PCO—7 and PCO—8 relays operated during actuation. This leaves the asked position indicators blank.

*Blank tens*

The indicators preferably exhibit the tens, units and fractions of the bid and asked prices. If either of the bid and asked prices do not involve a digit in the tens position the indicator wheel in the tens position may be turned to the blank position and left thereby depression of the blank key as the relays in sections "—3" and "—6" are ready to be operated.

When the blank key is depressed in place of the numeral key when writing the tens of the bid price, the key leads *b, c, d,* will be grounded thus operating the relay B—3, C—3, D—3. As soon as the sender circuit is closed the relay BTB operates from battery, over the line 160, contact of relay 1—B, line 161, make contact 137 of relay B—3, make contact 138 of relay C—3, and make contact 139 of relay D—3 to ground. During actuation the relay PCO—3 will be held operated through a make contact 165 on relay BTB and make contact on relay ACT—L to battery.

If the blank key is depressed in place of the numeral key when writing the tens of the asked price the relay ATB will be picked up by a circuit from battery over the coil of relay ATB, line 166, contact of relay 1—B, and contacts of relays B—6, C—6, D—6 as in the case of the circuit of the relay BTB. The relay ATB picks up and during actuation it holds up the relay PCO—6 over its make contact 167, and a make contact of the relay ACT—L thus preventing any of the actuation impulses from going to the tens wheel of the asked indicator wheels of the selected stock and of the asked indicators on the check board associated with the jack outlet to which the key set is attached.

While the invention has been described with respect to a preferred example thereof which gives satisfactory results, it will be understood by those skilled in the art after understanding the invention that numerous changes and modifications may be made without departing from the spirit and scope of the invention, and it is intended therefore in the appended claims to cover all such changes and modifications.

What is claimed as new and desired to be acquired by Letters Patent of the United States is:

1. In a quotation system comprising a transmitting mechanism, a plurality of key sets each adapted to control said transmitting mechanism to transmit stock selection and actuation signals, an indicator board comprising a plurality of groups of indicators relating to different items, a check board associated with each keyset, each comprising a group of indicators for indicating the same information as that set up on a group of indicators on the quotation board and another group of indicators for indicating the stock designation, and means under control of the transmitting mechanism for selectively operating the indicators relating to any stock and for setting up the same information and the stock designation on the indicators of the check board associated with the operated keyset.

2. In a quotation system, the combination of a quotation board comprising a plurality of groups of indicators, a keyboard, a group of indicators associated with the keyboard said indicators including price and stock designation indicators, a plurality of groups of relays for receiving a set-up as to stock designation and prices under control of the keyboard, means set in operation as the set-up is completed for effecting selection of a group of indicators on the quotation board and for restoring the selected group of indicators and indicators of the check board to blank position, and means set in operation after this restoration has been completed for setting the price indicators of the selected group on the quotation board and the price indicators of the check board to indicate the new price and for operating the stock designation indicators on the check board to indicate the stock posted.

3. In a quotation system, the combination of a quotation board comprising a plurality of groups of indicators, a keyboard, a check board comprising price digit and stock number indicators, storage mechanisms for receiving a set-up as to the stock number and new prices of the indicators to be set up, means for selecting a group of indicators on the stock quotation board under control of the stock selection storage mechanism, means for returning the selected indicators on the stock quotation board and all of the indicators on the check board to the blank position, means for actuating the selected quotation board indicators and the price indicators on the check board forwardly under control of the price storage mechanism, and means whereby the stock number storage mechanism will control the setting-up operation of the stock number indicators in the check board.

4. In a quotation system, a quotation board comprising a plurality of groups of price indicators, a check board comprising a single group of price indicators and stock number indicators, means for controlling the selection of a group of indicators on the quotation board, means for controlling the price to be set up on the indicators, and impulsing means for sending impulses simultaneously to the selected indicators on the quotation board and to the price indicators of the check board under control of the price controlling means and to the stock number indicators on the check board under control of the stock selection controlling means.

5. In a quotation system, the combination of a plurality of groups of indicators, a check board comprising a single group of price indicators and stock number indicators, means for controlling the selection of any group of indicators, means for controlling the price setting-up operation of the selected group of indicators, and means for substantially simultaneously setting up the price indicators on the check board under control of the price controlling means and the stock number indicators under control of the selection controlling means.

6. In a quotation system, the combination of a plurality of key sets, a group of check indicators associated with each key set, a quotation board including a plurality of groups of indicators, and mechanism under control of said key sets for selecting and operating any group of indicators and for setting-up on the check board associated with the operated key set an indication of the information set up on the quotation board.

7. In a quotation system, the combination of a plurality of key sets, a check board associated with each key set, a quotation board comprising a plurality of groups of indicators, a pair of senders, means for controlling the successive operation of said senders under the control of successively operated keysets for part concurrent operation when necessary, and means for controlling each sender under control of any of said key sets to select and set up any group of indicators on the quotation board and to set up the indicators on the check board associated with the key set controlling the sender.

8. In a quotation system, the combination of stock number selecting controlling means, price controlling means, a quotation board comprising a plurality of groups of indicators, a check board comprising price and stock number indicators, means for selecting any group of indicators on the quotation board under control of the stock number selecting means, a counting chain of relays, impulsing means, means for restoring selected indicators and the price indicators on the check board to blank position under control of said counting chain of relays, and means for setting-up the price and stock number indicators on the check board and on the quotation board under control of the counting chain of relays and the price and stock number controlling means.

9. In a quotation system, the combination of a quotation board comprising a plurality of groups of indicators, a plurality of sending mechanisms for transmitting electrical variations to select and control the operation of any group of indicators, a plurality of key sets, separate means under control of each key set for controlling said sending mechanisms, and means for alternately connecting said sending mechanisms with said first mentioned means.

10. In a quotation system, the combination of a plurality of key sets, a group of storage relays associated with each key set, an allotter for causing the information set up on any key set to be entered alternately in the storage relays of the associated group of storage relays, a plurality of senders operable successively and part concurrently when necessary, a common quotation board comprising a plurality of groups of indicators, and a seeker mechanism for connecting the storage relays associated with the various key sets in a predetermined order to the senders so that the senders will operate alternately under control of said storage relays to select and set up a group of indicators on the quotation board.

11. In a quotation system, the combination of a plurality of key sets, a plurality of groups of storage relays associated with each key set, means for causing the groups of storage relays of each set to operate alternately under control of their associated key set, a quotation board including a plurality of groups of indicators, sending mechanisms operable under control of said groups of relays for selectively operating said groups of indicators, and means for controlling said sending mechanisms successively first under control of certain of the corresponding ones of said groups of storage relays, and subsequently under control of other corresponding ones of said groups of storage relays.

12. In a quotation system, the combination of a plurality of pairs of groups of storage relays, a key set for each pair of groups of storage relays, means for alternately controlling said relays under the control of said key set, a pair of senders, seekers for placing either of said senders under control of any one of said groups of storage relays, and means for preventing either seeker from placing an operating sender under control of any said groups of storage relays.

13. In a quotation system the combination of a quotation board comprising a plurality of groups of indicators, a plurality of groups of storage relays for controlling the selection and operation of any group of indicators, sending mechanisms adapted to be controlled by any of said groups of storage relays for effecting selection and operation of any group of indicators, a pair of seekers for connecting said groups of storage relays to said sending mechanisms, and means for releasing the storage relays of any group in which the set-up is being made and for preventing operation of either of the seekers to prevent connection between the group of storage relays and the sending mechanisms.

14. The combination of a stock quotation board comprising a plurality of groups of indicators, a pair of sending mechanisms for transmitting electrical variations for selecting and operating any of said groups of indicators, a seeker associated with each sending mechanism, a plurality of pairs of storage relays for controlling said sending mechanisms, all of said pairs of storage relays being associated with each seeker whereby each seeker may connect any of said storage relays to either of said senders, and means for alternately operating said seekers to control the sending mechanisms alternately from said storage relays.

15. The combination of a stock quotation board comprising a plurality of groups of electromagnetically operated indicators, a pair of selection controlling and indicator operating sending mechanisms, a pair of relays for connecting each group of indicators to said sending mechanisms, each relay being associated with one of the sending mechanisms and being operated thereby, and a locking circuit for each relay adapted to be released by the associated sending mechanisms after the indicators have been adjusted.

16. In a quotation system the combination of a plurality of senders for transmitting electrical variations for selecting and operating any one of a plurality of groups of indicators, pairs of storage relays, means for connecting one of each of said pairs of storage relays to one sender and the others to the other sender, and a pair of seekers for effecting connection between any of said storage relays and either of said senders.

17. In a quotation system the combination of a plurality of groups of storage relays for storing information as to the price and stock designation of the stock, a sending mechanism, a seeker mechanism, means operated as the last item of information is stored for initiating operation of the seeker mechanism, and means operated by the seeker mechanism for placing the sending mechanism under control of the operated group of storage relays.

18. In a quotation system the combination of a plurality of groups of storage relays for storing information as to the price and stock designation of the stock, a pair of sending mechanisms, a seeker for each sending mechanism, means controlling the alternate operation of said seekers, means operated as the last item of information is entered in any group of storage relays for initiating operation of one of said seekers, and means operated by the seeker for connecting its associated sending mechanism to said group of storage relays.

19. In a quotation system including a transmitting station and a receiving station, a plurality of groups of indicators in the receiving station, a key set, a pair of groups of storage devices operable alternately under control of the key set, a pair of sending mechanisms each operable under control of either of said groups of storage devices for transmitting electrical variations for controlling the selection and operation of any of said groups of indicators, means in the receiving station responsive to such transmitted electrical variations for selecting and operating any desired group of indicators, a check board in the transmitting station comprising a single group of indicators, and means associated with said indicators and responsive to said electrical variations transmitted by said sending mechanisms for operating said indicators.

20. In a quotation system, the combination of a quotation board comprising a plurality of groups of indicators, a plurality of key sets, a check board for each key set including a group of indicators, a pair of senders, means for operating either sender under control of any one of said key sets, said senders transmitting electrical impulses for selecting and controlling the operation of any group of indicators in the quotation board, and electrical connections from the operating sender to the group of indicators in the check board associated with the controlling key set for causing said electrical variations to be transmitted to said group of indicators in said check board.

21. In a quotation system, the combination of a quotation board comprising a plurality of groups of indicators, a plurality of keysets, a pair of senders for transmitting electrical variations under control of said keysets for selecting and operating any group of indicators, means for setting said senders in operation successively and for placing either sender under control of any one of said keysets, either of said senders being adapted to be set in operation during an operation of the other sender, a checkboard associated with each keyset, and means connecting the checkboard associated with an operated keyset in parallel with the group of indicators selected and operated by electrical variations transmitted by either of said senders under control of any operated keyset.

22. In a quotation system, the combination of a quotation board comprising a plurality of groups of indicators each group including bid and asked assemblies, each of which comprises several denominational indicator wheels; a key mechanism for setting up stock selection information and bid and asked price information, including a control to set the highest denominational wheel of either or both of said assemblies into blank position, storage mechanism operable under control of said key mechanism, and a transmitting mechanism operable under said storage mechanism for selecting any group of bid and asked indicator assemblies, for transmitting impulses for normalizing all of the indicator wheels of said selecting assemblies and for setting up the new bid and asked price on said assemblies, and means operable under control of said storage mechanism for preventing any actuating impulses from being transmitted to the highest denominational wheel of either or both bid and asked assemblies of a selected group as determined by operated keys of said key mechanism.

23. In a quotation system, the combination of a quotation board comprising a plurality of groups of indicators, a plurality of keysets, a plurality of senders each operable under control of any one of the keysets to select and operate any one of the groups of indicators, means under control of said keysets for initiating the operation of said senders successively, said senders being operated in part concurrently when required, a checkboard associated with each keyset, each checkboard including a group of indicators, and means for operating either sender under the control of any of said keysets for selecting and setting up the group of indicators in the checkboard associated with the operated keyset.

RAYMOND M. HICKS.
FRAZIER O. STRATTON.